UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

CELLULOSE-ESTER COMPOSITION.

1,360,759.  Specification of Letters Patent.  Patented Nov. 30, 1920.

No Drawing.  Application filed June 19, 1920. Serial No. 390,133.

*To all whom it may concern:*

Be it known that I, JOHANNES M. KESSLER, a citizen of the United States, and a resident of West Orange, in the county of Essex and State of New Jersey, have invented a certain new and useful Cellulose-Ester Composition, of which the following is a specification.

This invention relates to cellulose ester compositions, and primarily cellulose nitrate compositions containing an acetin free from monoacetin as a softening agent, either alone or in combination with camphor or suitable camphor substitutes. More particularly my invention comprises a pyroxylin plastic in which some or all of the camphor ordinarily present is replaced by acetylated glycerol which is substantially free from glyceryl monoacetate (mono-acetin) and from acetic acid, and which contains preferably, more than 50% of glyceryl triacetate (triacetin), the remainder being glyceryl diacetate.

The application of the commercial acetate of glycerin, (known as "acetin") as a solvent or colloiding agent for pyroxylin was patented as long ago as 1889 by Schüpphaus in Patent 410208, and is included as part of the invention in the provisional specification of British Patent 13,131 of 1900 to Goldsmith. In more recent years patents have been granted covering its use in connection with cellulose acetate. Although known for so many years acetin has never found, as far as I know, practical application in the pyroxylin industry.

The main objection to the use of acetin, and one which accounts for its having been discarded by manufacturers as a substitute for camphor, was recognized by Schüpphaus himself, as appears from the following statement in his Patent No. 598,648 granted in 1898 (lines 16 to 26 of page 1), "In my former patent of the United States No. 410,208, of September 3, 1889, I have pointed out the utility of the acetins—*i. e.*, the acetates or acetic esters of glycerol—in the manufacture of highly-viscous pyroxylin solutions and of solid compounds possessing great flexibility. I have, however, found that in atmospheres heavily charged with moisture these compounds may become covered with water, owing to the hygroscopic nature of the acetins."

The remedy which Schüpphaus proposes is to introduce the radical of an acid other than acetic acid into the acetins. Although the resulting mixed esters may be an improvement over commercial acetin in not being so hygroscopic, they also as far as I know have not found practical application, undoubtedly due to their more complicated method of manufacture and their relatively high cost.

My researches have now made clear the following facts:

The commercial acetate of glycerol consists of a mixture of mono, di, and tri acetin. The mono-acetin is a very hygroscopic product, easily soluble in water; diacetin, although less hygroscopic, is quite soluble in water; whereas triacetin is the least soluble. Owing to the fact that mono-acetin readily absorbs moisture from the atmosphere, it is obviously not suitable for use in pyroxylin compounds, particularly pyroxylin solutions, as it forms a white film. Diacetin absorbs moisture to a less degree and when used alone also gives a white film, but when used with a sufficient amount of triacetin produces a transparent film. It can, therefore, easily be seen why commercial acetate of glycerol has not been found of practical importance in the pyroxylin industry.

In carrying out experiments to ascertain the possible utility of acetin substantially free from mono-acetin, I found that such an acetin containing more than 75% of triacetin yielded a plastic that was free from the objectionable features that ordinarily resulted from the use of commercial acetins. As the result of further investigation, I have now discovered that for many purposes an acetin containing much less than 75% of, but preferably more than 50%, triacetin, can be employed as a softener in cellulose ester compositions, and particularly in connection with pyroxylin plastics, provided care is taken to exclude mono-acetin and free acetic acid.

My invention may be illustrated by the following example:—

A mixture of 100 parts of pyroxylin, preferably anhydrous, about 60 parts by weight of denatured alcohol, and about 28 parts of acetin free from mono-acetin, and containing about 65% of triacetin, is kneaded, preferably at an elevated temperature of from 40 to 55° C., until properly colloided, after which it is put on the rolls and through the different operations, such as rolling, cake pressing, sheeting and seasoning which are well known in the manufacture of cellulose nitrate plastics, such as pyralin, celluloid, etc. Suitable amounts of stabilizer, for example, urea, pigments and colors may be added either during the mixing or the rolling operation. The proportion of the ingredients given above may be varied within certain limits. Also other solvents, such as wood alcohol, acetone, etc., may be used in place of denatured alcohol. If a certain amount of camphor or another camphor substitute besides acetin is used, the amount of acetin necessary for proper colloiding is decreased; preferably the total amount of camphor and camphor substitutes including the acetin is not more than 31 parts for about 100 parts of nitrocellulose.

The acetin which can be used may, as indicated above, vary considerably with respect to the ratio of diacetin to triacetin, but ordinarily the triacetin content should be above 50%. The ratio of cellulose nitrate to softener may also vary to some extent, as for example, from 4:1 to 3:1; beyond these limits a satisfactory plastic is obtainable only with difficulty.

An acetin substantially free from mono-acetin and acetic acid and suitable for my purpose may be made as follows:

Glycerol (1 mol.) is treated with glacial acetic acid (5 to 6 mols.) and 0.1% sulfuric acid as catalyzer, and there is distilled off, through a very efficient fractionating column, in the form of dilute acetic acid, the water formed during the reaction, until the strength of the acid coming over reaches 90% or more. After neutralizing the catalyzer with sodium acetate and distilling off the excess of free acetic acid as far as possible at ordinary pressure, the residue is then subjected to fractional distillation in vacuum, yielding a final neutral product with more than 60% triacetin.

Liquid coating compositions may be made from the above described plastics by adding sufficient solvent, for example methyl alcohol and an alkyl acetate, such as ethyl or amyl acetate, to produce a thin or a viscous solution. By flowing the viscous solution on to smooth surfaces, sheets or films having very desirable properties are readily obtained, after evaporation of the solvent.

I claim:

1. A composition containing a cellulose nitrate and an acetin substantially free from mono-acetin and from free acetic acid.

2. A composition containing a cellulose nitrate and an acetin substantially free from mono-acetin and containing at least 50% of triacetin.

3. A composition consisting essentially of cellulose nitrate and a softener comprising acetin substantially free from mono-acetin and containing at least 50% of triacetin, the ratio of said cellulose nitrate to said softener being from about 3:1 to 4:1.

4. A composition consisting essentially of cellulose nitrate and a softener comprising camphor and an acetin substantially free from mono-acetin.

5. A composition consisting essentially of cellulose nitrate and a softener comprising camphor and an acetin substantially free from mono-acetin and containing at least 50% of triacetin.

6. A composition consisting essentially of cellulose nitrate and a softener comprising camphor and an acetin substantially free from mono-acetin, the ratio of said cellulose nitrate to said softener being about 3:1.

7. A composition consisting essentially of cellulose nitrate and a softener comprising camphor and an acetin substantially free from mono-acetin and containing at least 50% of triacetin, the ratio of said cellulose nitrate to said softener being about 3:1.

8. A composition consisting essentially of cellulose nitrate and a softener comprising acetin substantially free from mono-acetin, said acetin containing from about 40 to 30% of diacetin, and from about 60 to 70% of triacetin.

9. A composition consisting essentially of cellulose nitrate and a softener comprising camphor and acetin substantially free from mono-acetin, said acetin containing from about 40 to 30% of diacetin, and from about 60 to 70% of triacetin, the ratio of said cellulose nitrate to said softener being about 3:1.

10. A composition consisting essentially of cellulose nitrate and a softener comprising camphor and acetin, substantially free from mono-acetin, said acetin containing from about 40 to 30% of diacetin, and from about 60 to 70% of triacetin.

In testimony whereof I affix my signature.

JOHANNES M. KESSLER.